Sept. 1, 1925.
J. J. ALTHOUSEN
RAT TRAP
Filed Feb. 3, 1925
1,552,377
2 Sheets-Sheet 1
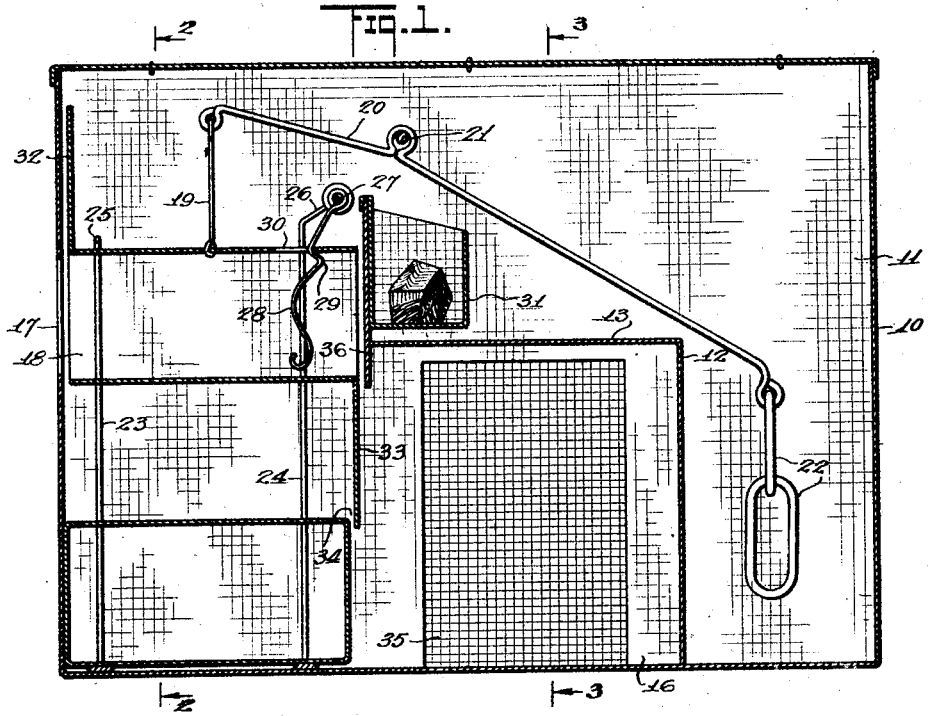
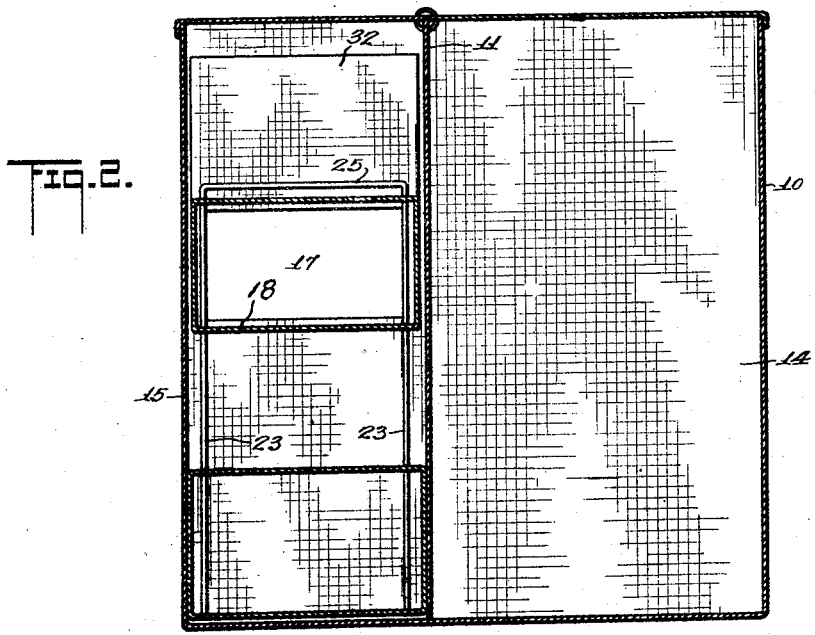
WITNESSES
INVENTOR
J. J. Althousen.
BY
ATTORNEYS Sept. 1, 1925.  1,552,377
J. J. ALTHOUSEN
RAT TRAP
Filed Feb. 3, 1925   2 Sheets-Sheet 2
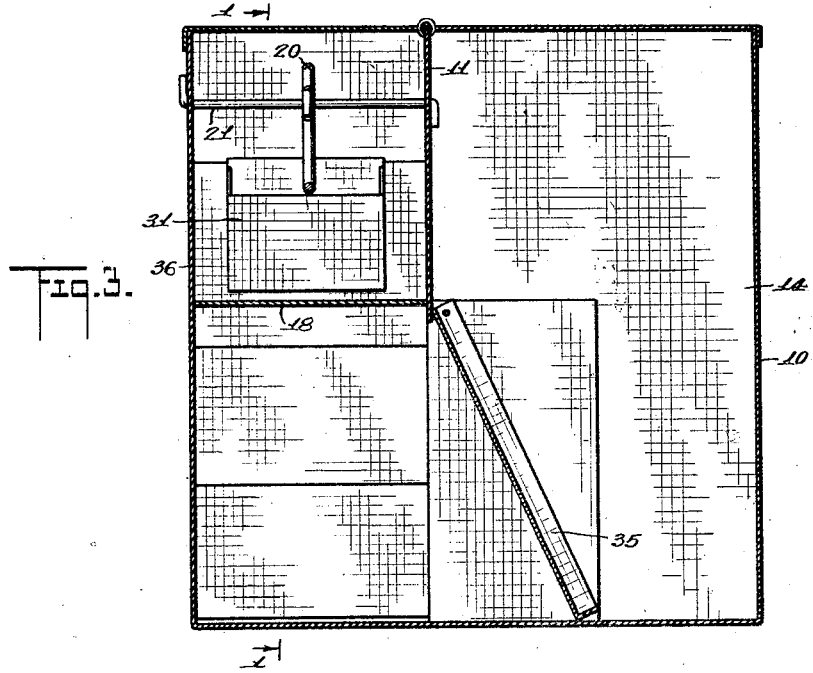
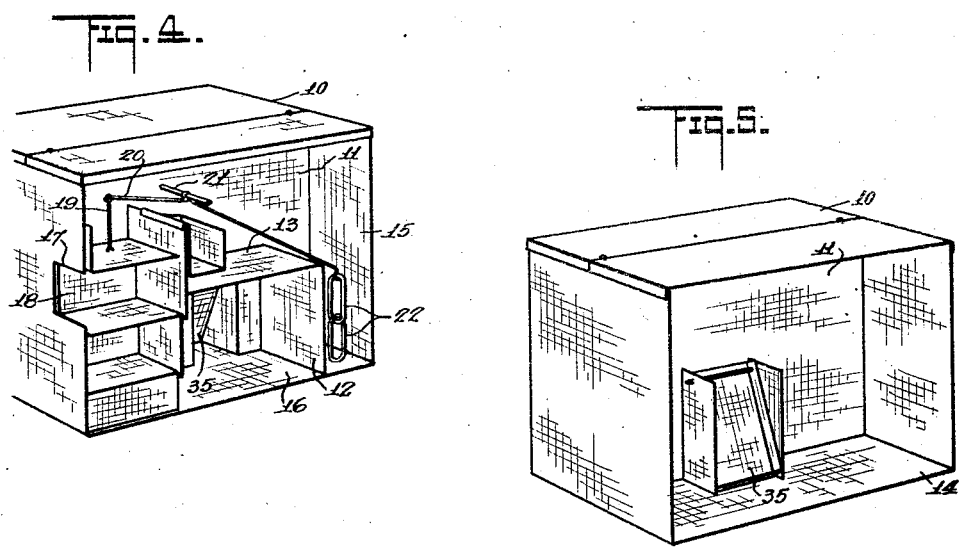
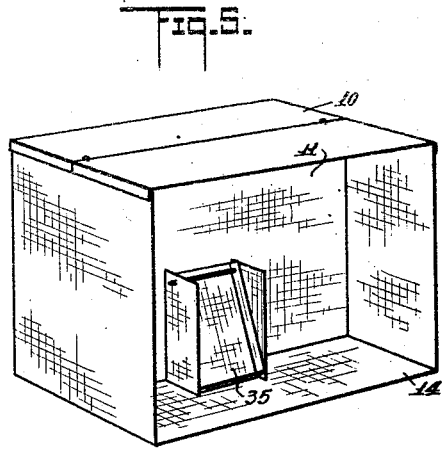
INVENTOR
J. J. Althousen.
BY
ATTORNEYS Patented Sept. 1, 1925.

1,552,377

UNITED STATES PATENT OFFICE.

JOHN JOSEPH ALTHOUSEN, OF EVANSVILLE, INDIANA.

RAT TRAP.

Application filed February 3, 1925. Serial No. 6,562.

*To all whom it may concern:*

Be it known that I, JOHN J. ALTHOUSEN, a citizen of the United States of America, and a resident of Evansville, in the county of Vanderburg and State of Indiana, have invented a new and Improved Rat Trap, of which the following is a description.

My invention relates to a rat trap and particularly to a trap in which the weight of a rat entering the trap serves to bring about a shifting of and relative movement of the parts to require that the rat enter a compartment from which there can be no return to the entrance.

The general object of my invention is to provide a trap as indicated and so constructed and arranged as to unfailingly cause the rat to trap himself.

The nature of my invention and its distinguishing features and advantages will clearly appear as the description proceeds.

Reference is to be had to the accompanying drawings forming a part of this specification, it being understood that the drawings are merely illustrative of one example of the invention.

Figure 1 is a longitudinal vertical section of a trap embodying my invention on the line 1—1, Figure 3;

Figure 2 is a transverse vertical section on the line 2—2, Figure 1;

Figure 3 is a transverse vertical section on the line 3—3, Figure 1;

Figure 4 is a schematic view in perspective with a side of the trap removed;

Figure 5 is a diagrammatic view at the opposite side from that shown in Figure 4.

In carrying out my invention the trap is made from woven wire or other reticulated or openwork material that the interior may be visible throughout. The trap includes a box-like structure 10 having a vertical partition 11 dividing the trap generally into two compartments 14, 15 the compartment 14 being larger and the compartment 15 containing the major portion of the operative parts. An auxiliary partition is provided consisting of a vertical member 12 and a top 13 forming with the partition 11 and with one side wall and auxiliary enclosure 16, said auxiliary enclosure being within the compartment 15.

In the front wall of the box-like structure 10 an opening 17 is formed through which a rat may enter. An entrance tube 18 for the rat is suspended in compartment 15 normally in line with the opening 17 by a hanger 19 on the end of a lever 20 fulcrumed as by a cross bar 21 and having weight means 22 to counterbalance entrance tube 18. The entrance tube 18 is capable of vertical movement in compartment 15 between vertical guides 23, 24, disposed at opposite sides extending freely through the tube 18. The side guides 23 are joined by an arch or top bar 25. The vertical guides 24 are offset at their upper ends as at 26 and joined by a cross bar 27 on which is pivoted a trigger 28 having a kink 29 adapted to engage the top of the tube 18 at the slot 30 through which said trigger extends. The tube 18 is open at both ends and adjacent the inner end is a bait box 31 which may be seen through the entrance opening 17 and through the tube 18.

Extending upwardly from the tube 18 at the entrance end is a flange 32 and depending from the under side of said tube is a flange 33. The flange 32 normally is disposed above the entrance 17 but as the tube 18 lowers, said flange 32 closes the entrance 17. The flange 33, as the tube 18 lowers, closes an opening 34 leading to the auxiliary enclosure 16. At that side of the enclosure 16 disposed adjacent the main compartment 14 is an inclined trap door 35 hinged at its upper end to gravitate to a closed position after it has been opened by a rat moving into the main compartment 14.

With the above described construction, a rat entering the opening 17 is required to pass into the entrance tube 18 which is held suspended in line with the opening 17 by the trigger 28 engaging said tube 18 at the slot 30. The rat in his efforts to reach the bait in the box 31 disturbs the trigger 28 so that the kink 29 is disengaged from tube 18 releasing said tube and permitting it to lower under the weight of the rat. As the tube 18 lowers with the rat the flange 32 closes the opening 17 and the flange 33 is carried below the opening 34 leaving the tube 18 to register with the opening 34, thus permitting the rat to pass from the tube 18 to the auxiliary enclosure 16. The only escape for the rat from the enclosure 16 is by lifting the door 35 and after the rat passes beneath said door the latter closes automatically leaving the rat trapped in the main compartment 14.

In the normal position of the tube 18 there is disposed in front of the same a fixed vertical partition 36 requiring the rat to remain in the tube 18 until the latter lowers into alinement with the opening 34.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. In a trap, a box-like structure having a vertical partition dividing the structure into two compartments, an auxiliary enclosure in one of said compartments, a trap door leading from the auxiliary enclosure to the other compartment, said structure at the front having an entrance opening, an entrance tube open at both ends and normally disposed in line with said entrance opening, counterbalance means suspending said entrance tube, a trigger normally holding the entrance tube raised, a bait box adjacent the inner end of said tube and adjacent said trigger, said auxiliary enclosure having an entrance opening below the normal position of the entrance tube and adapted to register with said entrance tube in the lowered position thereof.

2. A trap including a box-like structure having a vertical partition dividing the same into compartments, the front of said structure having an entrance opening, a vertically movable entrance tube adapted to accommodate an animal and suspended in one of said compartments, vertical side guides engaging said entrance tube to guide said tube in its up and down movements, means connecting two of said vertical guides disposed at opposite sides of said tube, and a trigger suspended on said connecting means, the inner end of said entrance tube affording escape for the animal in the lowered position of said tube.

JOHN JOSEPH ALTHOUSEN.